THOMAS DREW, OF NEWTON, ASSIGNOR TO HIMSELF AND JAMES P. BRIDGE, OF BOSTON, MASSACHUSETTS.

Letters Patent No. 85,434, dated December 29, 1868.

IMPROVED COMPOUND FOR EXTINGUISHING FIRES.

The Schedule referred to in these Letters Patent and making part of the same.

*To all whom it may concern:*

Be it known that I, THOMAS DREW, of Newton, in the county of Middlesex, and State of Massachusetts, have invented a new and improved Compound for Extinguishing Fires; and I do hereby declare that the following is a full, clear, and explicit description thereof.

The object of this invention is to provide a material or compound that may be dissolved in water, and when its solution is thrown upon fire or flame, will extinguish the same much more effectually and rapidly than water alone.

I have found by my experiments that sulphite (not sulphate) of soda and hyposulphite of soda are excellently well adapted to this purpose. I have also found that a compound made by mixing one or both of these salts with carbonate of ammonia is also a superior extinguisher of fire and flame.

I do not confine myself to any proportions of these substances, nor to any particular means of conveying the solutions to the fire, whether by pumps or otherwise; but I desire to secure to myself the benefits of this discovery and result of my experiment.

I do not claim the use of carbonate of ammonia in solution for extinguishing fires, nor do I claim the use of salts of ammonia in combination with other salts which, by mutual reaction, would produce the carbonate of ammonia, as that is described in the patent of E. A. Galbraith, August 4, 1868.

Having thus described my invention,

I claim as new, and desire to secure by Letters Patent—

The application of sulphite and hyposulphite of soda, either singly or mixed, and in solution with water, as extinguishers of fires.

THOMAS DREW.

Witnesses.
   AUGUSTINE JONES,
   JAMES FLYNN.